US006845136B1

United States Patent
Van Der Putten et al.

(10) Patent No.: US 6,845,136 B1
(45) Date of Patent: Jan. 18, 2005

(54) METHOD TO SYNCHRONIZE DATA AND A TRANSISTOR AND A RECEIVER REALIZING SAID METHOD

(75) Inventors: Frank Octaaf Van Der Putten, Hombeek (BE); Paul Marie Pierre Spruyt, Heverlee (BE); Karel Adriaensen, Antwerp (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/280,435

(22) Filed: Mar. 29, 1999

Related U.S. Application Data

(63) Continuation of application No. 08/965,136, filed on Nov. 6, 1997.
(60) Provisional application No. 60/052,126, filed on Jul. 10, 1997.

(30) Foreign Application Priority Data

Aug. 11, 1996 (EP) ............................................. 06402393

(51) Int. Cl.[7] ................................................ H04L 7/00
(52) U.S. Cl. ...................... 375/358; 375/354; 375/316; 375/295
(58) Field of Search ................................. 375/358, 354, 375/295, 316, 219, 222; 370/395, 396; 455/68, 69, 70

(56) References Cited

U.S. PATENT DOCUMENTS 4,763,103 A * 8/1988 Galula et al. ................ 375/130
5,003,558 A   3/1991 Gregg ......................... 375/108
5,430,724 A   7/1995 Fall et al. ..................... 370/79
5,434,892 A   7/1995 Dike et al. ................... 375/377
5,625,651 A   4/1997 Cioffi .......................... 375/354
5,787,114 A   7/1998 Ramamurthy et al. ...... 375/221
5,894,476 A * 4/1999 Fraser ...................... 370/395.1
5,898,744 A * 4/1999 Kimbrow et al. ........... 375/376
5,966,409 A * 10/1999 Maeda et al. ............... 375/295

FOREIGN PATENT DOCUMENTS

DE            4225407           2/1994

OTHER PUBLICATIONS

"Interfaces, framing and bitrates for ATM over ADSL" by Paul Spruyt et al, Standards Project T1E1.4: ADSL, Apr. 22–25, 1996, Colorado Springs, CO.

* cited by examiner

*Primary Examiner*—Jean B. Corrielus

(57) ABSTRACT

A method to realize synchronization in a receiver (RX), of data (DAT) sent from a transmitter (TX) to the receiver (RX), with a signal (SIG) available in the receiver (RX). The method includes the following steps:

in the receiver (RX) generating trigger signals (T) from the signal (SIG);

sending the trigger signals (T) from the receiver (RX) to the transmitter (TX); and upon receipt of the trigger signals (T) by the transmitter (TX) sending the data (DAT) from the transmitter (TX) to the receiver (RX).

13 Claims, 1 Drawing Sheet

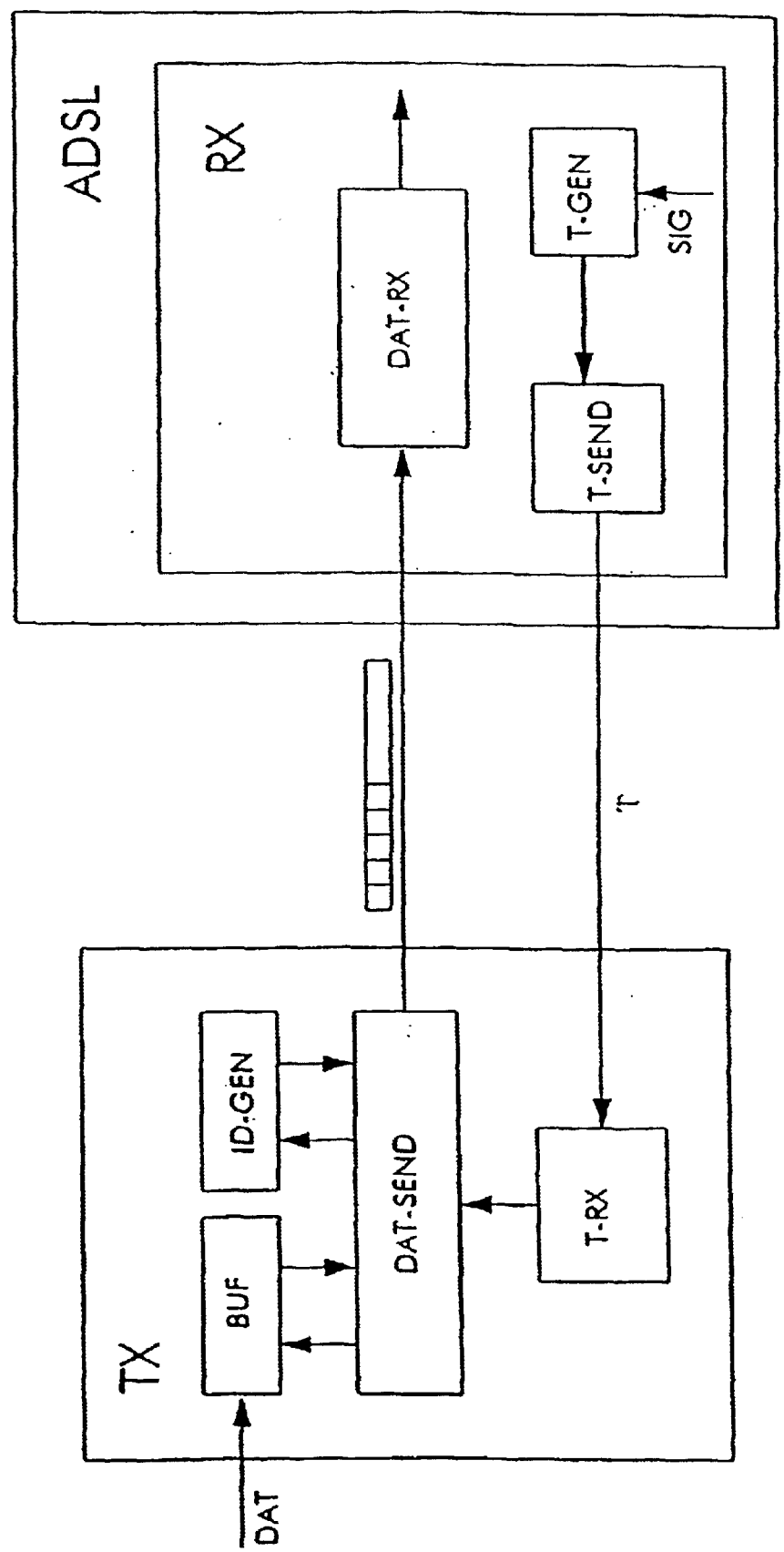

METHOD TO SYNCHRONIZE DATA AND A TRANSISTOR AND A RECEIVER REALIZING SAID METHOD

PRIORITY CLAIM

In addition to claiming priority under 35 USC §119(a) from EPO Application 96402393.1 filed Nov. 8, 1996, this application also claims the benefit under 35 USC §119(e) of U.S. Provisional Application No. 60/052,126, filed Jul. 10, 1997, and under 35 USC §120 which is a continuation of U.S. patent application Ser. No. 08/965,136, filed Nov. 6, 1997 now U.S. Pat. No. 5,903,612.

BACKGROUND OF THE INVENTION

1. Technical Field

The present invention relates to a method to synchronize data, and a transmitter and a receiver realizing said method.

2. Discussion of Related Art

Such a method to synchronize data is common knowledge. Indeed, e.g., in communication systems where data is sent from a transmitter to a receiver, for the receiver to be able to interpret the received data, the received data have to be synchronized in the receiver with a reference signal, usually a clock signal of the receiver. Realizing synchronization implies more complexity and therefore there is a need for additional hardware of software in the receiver. The trade-offs are generally between expense and complexity, on the one hand, and error performance on the other hand. However, some kind of receivers, e.g., receivers using asymmetric digital subscriber line technology are required to have both, a low complexity and also a low error performance.

SUMMARY OF INVENTION

An object of the present invention is to provide a method to synchronize data and a transmitter and a receiver realizing said method of the above known type but which are suited for use in communication systems where a low complexity and a low error performance are required at the receiving side of the communication system.

According to a first aspect of the invention, a method to realize synchronization in a receiver, of data sent from a transmitter to said receiver, with a signal available in said receiver, is characterized in that said method includes the steps of: in said receiver generating trigger signals from said signal available in said receiver, sending said trigger signals from said receiver to said transmitter, and upon receipt of said trigger signals by said transmitter sending said data from said transmitter to said receiver.

According to a second aspect of the invention, a receiver for receiving data from a transmitter, said data having to be synchronous with a signal available in said receiver, is characterized in that said receiver includes trigger generating means to generate trigger signals from said signal available in said receiver, trigger sending means to send said trigger signals from said receiver to said transmitter, and data receiving means to receive said data sent by said transmitter to said receiver upon receipt of said trigger signals.

According to a third aspect of the invention, a transmitter for transmitting data to a receiver, said data having to be synchronous with a signal available in said receiver, is characterized in that said transmitter includes trigger receiving means to receive trigger signals, generated by said receiver from said signal available in said receiver and sent from said receiver to said transmitter, and data sending means to send data from said transmitter to said receiver upon receipt of said trigger signals.

Indeed, due to the trigger signals generated from the signal available in the receiver and sent to the transmitter, the transmitter is able to send the data to the receiver upon receipt of the trigger signals, i.e., at the right time to ensure synchronization between the data received in the receiver and the available signal, e.g., a clock signal in the receiver. In this way, the complexity of the synchronization process is moved from the receiver side to the transmitter side of the communication system and each level of synchronization can be realized with the required level of error performance and without making the receiver too complex.

Another characteristic feature of the present invention is that the data, sent from the transmitter to the receiver, is asynchronous data. Indeed, upon receipt of the trigger signals, the transmitter must be able to send data even if the trigger signals are sent in an asynchronous way. This is for instance the case when the receiver has to receive the data at a time moment at which the data has to just fit at a predefined place in a frame. In this way frame synchronization is achieved.

Yet another characteristic feature of the present invention is that in the even that no data is available in the transmitter to be sent upon receipt of the trigger signals, the transmitter is able to generate idle data and to send this idle data to the receiver. In this way, e.g., the frame synchronization process is not disturbed.

An important application of the present invention is that the receiver is included in an asymmetric digital subscriber line (ADSL) modem. In such a receiver, the received data is framed into an asymmetric digital subscriber line frame and sent over a twisted pair. However in known ADSL modems using the known synchronization methods, when the modem receives data at a higher frequency than the frequency at which the data is sent, the data has to be buffered before being framed. As already mentioned above, it is important to keep the complexity of a receiver in such a modem low. By using the method of the invention, the asymmetric digital subscriber line modem gets rid of, i.e., avoids, the buffering aspect. In fact., the buffering is again moved from the receiver to the transmitter which now must be able to buffer the data until it receives a trigger signal of the receiver to have the permission to send the data to the receiver. Therefore, this way of synchronizing is especially suited for systems wherein there is anyway buffering foreseen at the transmitting side, e.g., for Asynchronous Transmission Mode (ATM) systems.

BRIEF DESCRIPTION OF THE DRAWING

The above-mentioned and other objects and features of the invention will become more apparent and the invention itself will be best understood by referring to the following description of embodiment taken in conjunction with the accompanying sole FIGURE which is a schematic block diagram of a synchronization system including a transmitter and a receiver realizing the method of the invention.

DETAILED DESCRIPTION OF PREFERRED EMBODIMENT

Referring to the FIGURE, the working of the synchronization system will be described. First, the working of the synchronization system will be explained by means of a functional description of the blocks shown in the FIGURE. Based on this description, implementation of the functional blocks will be obvious to any person skilled in the art and will therefore not be described in detail. In addition, the principle working of the synchronization system will be described in further detail.

The synchronization system includes a transmitter TX and an asymmetric digital subscriber line modem (ADSL modem) ADSL.

The transmitter TX includes four functional blocks:
a buffer BUF;
an idle data generating means ID-GEN;
a data sending means DAT-SEND; and
a trigger receiving means T-RX.

The buffer BUF is included to buffer the data DAT presented to the transmitter TX. This data DAT can be digital data of any kind, however, for this embodiment the data DAT is asynchronous data, i.e., data organized following the asynchronous transfer mode (ATM) technique. As mentioned, the buffer BUF buffers the data DAT presented to the transmitter TX. However, it has to be understood that the buffer BUF will only do this when it is necessary, i.e., when the transmitter receives more data DAT than it is allowed to send.

The idle data generating means ID-GEN is included to generate idle data. It has to be remarked that this is provided to enable the use of one of the typical ATM functionalities. Idle data is sent whenever there is no information available at the side of the sender at the moment of transmission. This allows a fully asynchronous operation of both sender and receiver.

The data sending means DAT-SEND is included to send data from the transmitter TX to the ADSL modem. This data can be useful user information i.e. the data DAT coming from the buffer BUF or idle data, coming from the idle data generating means ID-GEN.

The trigger receiving means T-RX is included to receive trigger signals T coming from the ADSL modem. Upon receipt of such a trigger signal, the data sending means DAT-SEND is in turn triggered by the-trigger receiving means T-RX and is allowed to send data.

The ADSL modem includes besides a receiver RX also the characteristic functional blocks of an ADSL modem. Since the description of the ADSL technology goes beyond the scope of this invention, these functional blocks are not shown in the figure. However, it is worth mentioning here that one of the functional clocks of such an ADSL modem is a framer which organizes overhead information and user information, i.e., the incoming data DAT into ADSL frames, i.e., uniformly sized groups of bits used to organize the ADSL data stream.

The receiver RX includes three functional blocks:
trigger generating means T-GEN;
trigger sending means T-SEND; and
data receiving means DAT-RX.

The trigger generating means T-GEN is included to generate trigger signals T from an available signal SIG in the receiver RX. This available signal SIG is generated in accordance with the time moments whenever data DAT is needed to fit into an available ADSL frame in a predetermined place. This signal SIG is not necessarily a clock signal. Indeed, looking to the form of an ADSL frame, the whole frame need not be filled with data DAT, so as a consequence, the signal SIG is not a signal with a constant frequency.

It has to be remarked here that the trigger signals T are allowed to be of any kind, e.g., one single bit pulse or a predefined codeword as long as the trigger generating means T-GEN, of the receiver RX and the trigger receiving means T-RX of the transmitter can recognize the trigger signals T.

The trigger sending means T-SEND is included to send the trigger signals T from the receiver RX to the transmitter TX and the data receiving means DAT-RX is included to receive the data DAT coming from the transmitter TX.

The transmission medium for sending the trigger signals is in the figure depicted as a separate line to simplify the description of the working of the system. However, these signals can (and usually are) transmitted over the same transmission medium, i.e., a single twist wire pair, as the data.

The principle working of the synchronization system will be described in the following paragraph.

Whenever data DAT is needed to fit in an available ADSL frame in a predetermined place, a trigger signal T is-generated from the available signal SIG and transmitted to the transmitter TX. Upon receipt of a trigger signal T the trigger receiving means T-RX gives a signal to the data sending means DAT-SEND, e.g., by means of a control signal, and DAT-SEND in turn makes a signal request for data DAT to the buffer BUF. When there is data DAT available in the buffer BUF, the data DAT is provided to the data sending means DAT-SEND. However, when no data DAT is available in the buffer, the synchronization process may not be disturbed and the data sending means DAT-SEND requests idle data to the idle data generating means ID-GEN. The data, either user data or idle data, is sent to the receiver RX and arrives there at the right moment to fit immediately into the ADSL frame in the predetermined place whereby synchronization is established between the data DAT and the available signal SIG.

It has to be remarked that upon receipt of a trigger signal T, the transmitter TX has to send data DAT to the receiver RX. Sending data can be done immediately after receiving of the trigger signal T, however the invention is not restricted to such kind of synchronization systems but is also applicable for synchronization systems where the data DAT is only sent after a predetermined period. Indeed, in this particular embodiment, the total period between the moment of generating a particular trigger and the moment of data DAT arriving at the receiver RX to accordingly fit into a predefined ADSL frame must be taken into account at initialization time. It can be necessary to have a predetermined waiting period somewhere in the loop in order to be able to realize the synchronization. Since the complexity is moved from the receiver RX to the transmitter TX, this waiting period will also be realized by the transmitter TX.

It has to be remarked that due to the cell structure of the ATM data stream whenever idle data, not corresponding to a complete idle cell has been sent, that upon receipt of subsequent trigger signals T idle data has to be sent until the complete idle cell is transmitted, even if in the mean time some data DAT becomes available in the buffer BUF.

While the principles of the invention have been described above in connection with specific apparatus, it is to be clearly understood that this description is made only by way of example and not as a limitation on the scope of the invention.

What is claimed is:

1. A method to realize synchronization of data (DAT) sent from a transmitting entity (TX) to a receiving entity (RX), with a signal (SIG) available in said receiving entity (RX), characterized in that said method includes the steps of:

in said receiving entity (RX) generating said signal available in said receiving entity in accordance with a time moment when data fits into an available time frame, wherein said signal available in said receiving entity is not a signal with a constant frequency;

in said receiving entity (RX) generating a trigger signal (T) from said signal (SIG) available in said receiving entity;

sending said trigger signal (T) from said receiving entity (RX) to said transmitting entity (TX) to indicate that the transmitting entity is allowed to send said data (DAT); and upon receipt of said trigger signal (T) by said transmitting entity (TX) sending said data (DAT) from said transmitting entity (TX) to said receiving entity (RX) wherein said data (DAT) is for receipt in said receiving entity synchronized with said signal (SIG) available in said receiving entity.

2. The method according to claim 1, characterized in that said data (DAT) is asynchronous data.

3. The method according to claim 1, characterized in that in the event that no data is available in said transmitting entity (TX) to be sent upon receipt of said trigger signal, said method further includes the step of sending idle data from said transmitting entity (TX) to said receiving entity (RX).

4. A receiving entity (RX) for receiving from a transmitting entity (TX) data (DAT), said data (DAT) synchronous with a signal (SIG) available in said receiving entity (RX), characterized in that said receiving entity (RX) includes:

a trigger generator (T-GEN) to generate a trigger signal (T) from said signal (SIG) available in said receiving entity wherein said signal available in said receiving entity is indicative of a time moment when data fits into an available time frame, wherein said signal available in said receiving entity is not a signal with a constant frequency;

a trigger sender (T-SEND) to send said trigger signal (T) from said receiving entity (RX) to said transmitting entity (TX); and a data receiving entity (DAT-RX) to receive said data (DAT) sent by said transmitting entity (TX) to said receiving entity (RX) upon receipt of said trigger signal (T) wherein said data (DAT) is for receipt in said receiving entity synchronized with said signal (SIG) available in said receiving entity.

5. The receiving entity (RX) according to claim 4, characterized in that said receiving entity (RX) is included in an asymmetric digital subscriber line modem.

6. A transmitting entity (TX) for transmitting data (DAT) to a receiving entity (RX), said data (DAT) synchronous with a signal (SIG) available in said receiving entity (RX), characterized in that said transmitting entity (TX) includes:

a trigger receiving entity (T-RX) to receive a trigger signal (T) generated by said receiving entity (RX) from said signal (SIG) available in said receiving entity and sent from said receiving entity (RX) to said transmitting entity (TX) wherein said signal available in said receiving entity is indicative of a time moment when data fits into an available time frame, wherein said signal available in said receiving entity is not a signal with a constant frequency; and a data sending entity (DAT-SEND) to send data (DAT) from said transmitting entity (TX) to said receiving entity (RX) upon receipt of said trigger signal (T) wherein said data (DAT) is for receipt in said receiving entity already synchronized with said signal (SIG) available in said receiving entity.

7. The transmitting entity (TX) according to claim 6, characterized in that said transmitting entity (TX) includes an entity to send said data (DAT) asynchronously.

8. The transmitting entity (TX) according to claim 6, characterized in that said transmitting entity (TX) includes an idle data generator (ID-GEN) to generate idle data and to send said idle data from said transmitting entity (TX) to said receiving entity (RX) in the event that no data (DAT) is available in said transmitting entity (TX) upon receipt of said trigger signal (T).

9. The method of claim 1, wherein said transmitting entity is an asynchronous transfer mode (ATM) transmitter.

10. The method of claim 1, wherein said receiving entity comprises frames of a digital subscriber line data stream.

11. The method of claim 1, wherein upon receipt of said trigger signal (T), said transmitting entity (TX) sends said data immediately or after a predetermined period.

12. A receiving entity (RX) comprising:

a sending entity for sending an asynchronous trigger signal (T) from said receiving entity (RX) to a transmitting entity (RX) to indicate a moment when data from said transmitting entity is required;

receiving entity for receiving (DAT-RX) a data signal (DAT) with said data from said transmitting entity, at said moment when data from said transmitting entity is required; and trigger generating entity (T-GEN), responsive to a signal (SIG) available in said receiving entity but not having a constant frequency, for providing said asynchronous trigger signal.

13. The receiving entity of claim 12, wherein said data signal is synchronized with said signal available in said receiving entity.

* * * * *

UNITED STATES PATENT AND TRADEMARK OFFICE
CERTIFICATE OF CORRECTION

PATENT NO. : 6,845,136 B1
DATED : January 18, 2005
INVENTOR(S) : Frank Octaaf Van Der Putten, Paul Marie Pierre Spruyt and Karl Adriaensen It is certified that error appears in the above-identified patent and that said Letters Patent is hereby corrected as shown below:

Title page,
Item [54], Title, "TRANSISTOR" should be -- TRANSMIITER --

Column 6,
Line 36, "(RX)" should be -- (TX) --.

Signed and Sealed this

Twenty-sixth Day of April, 2005

JON W. DUDAS
*Director of the United States Patent and Trademark Office*